(12) United States Patent
Kneknas (10) Patent No.: US 11,135,477 B1
(45) Date of Patent: Oct. 5, 2021

(54) EXERCISE APPARATUS CALIBRATION SYSTEM

(71) Applicant: Philippos Kneknas, Astoria, NY (US)

(72) Inventor: Philippos Kneknas, Astoria, NY (US)

( * ) Notice: Subject to any disclaimer, the term of this patent is extended or adjusted under 35 U.S.C. 154(b) by 0 days.

(21) Appl. No.: 16/519,392

(22) Filed: Jul. 23, 2019

(51) Int. Cl.
| | | |
|---|---|---|
| *A63B 24/00* | (2006.01) | |
| *A63B 71/06* | (2006.01) | |
| *G01B 21/24* | (2006.01) | |
| *A63B 21/072* | (2006.01) | |

(52) U.S. Cl.
CPC ...... *A63B 24/0003* (2013.01); *A63B 21/0724* (2013.01); *A63B 24/0062* (2013.01); *A63B 71/0622* (2013.01); *G01B 21/24* (2013.01); *A63B 2024/0068* (2013.01); *A63B 2071/0627* (2013.01); *A63B 2220/20* (2013.01); *A63B 2220/833* (2013.01); *A63B 2225/02* (2013.01)

(58) Field of Classification Search
None
See application file for complete search history.

(56) References Cited

U.S. PATENT DOCUMENTS

| | | | | |
|---|---|---|---|---|
| 4,888,875 | A * | 12/1989 | Strother | A63B 21/0724 33/347 |
| 5,430,435 | A * | 7/1995 | Hoch | A61B 5/1121 273/DIG. 17 |
| 5,441,269 | A * | 8/1995 | Henwood | A63B 69/3685 473/220 |
| 7,666,118 | B1 | 2/2010 | Anthony | |
| 7,743,520 | B1 * | 6/2010 | Jiorle | G01C 9/28 33/366.11 |
| 8,436,737 | B1 * | 5/2013 | Trout | A61B 5/1116 340/573.7 |
| 8,602,945 | B1 * | 12/2013 | Haubrich | A63B 71/0622 482/8 |
| 8,870,717 | B2 | 10/2014 | Pfitzer | |
| 9,061,170 | B2 | 6/2015 | Alessandra et al. | |
| 9,623,285 | B1 * | 4/2017 | Ruiz | A61B 5/11 |
| 9,656,120 | B1 * | 5/2017 | Franco | A63B 71/0622 |
| 9,789,360 | B1 * | 10/2017 | Schaffer | A63B 24/0062 |
| 10,549,154 | B2 * | 2/2020 | Den Hollander | A63B 24/0003 |
| 10,918,909 | B2 * | 2/2021 | Davis | A63B 21/0726 |

(Continued)

FOREIGN PATENT DOCUMENTS

WO   WO-2019104388 A1 * 6/2019 ........... G01C 21/165

*Primary Examiner* — Sundhara M Ganesan
*Assistant Examiner* — Shila Jalalzadeh Abyaneh
(74) *Attorney, Agent, or Firm* — Goldstein Law Offices, P.C.

(57) ABSTRACT

An exercise calibration system for use with an exercise apparatus having a bar with a first end and second end, the system having a user device and a pair of exercise calibration devices comprising a right and left exercise calibration device attached to the first and second ends of the bar respectively, each exercise calibration device having a downward facing distance sensor adapted to detect an elevation measured between the distance sensor and a horizontal exercise surface. The exercise calibration devices measure a right and left elevation as the user performs a weightlifting exercise, and the user device alerts the user if an elevation discrepancy occurs between the first and second ends, instructing the user to raise either the first or second end until the right and left elevation are substantially equal.

8 Claims, 9 Drawing Sheets

(56) References Cited

U.S. PATENT DOCUMENTS

| | | | |
|---|---|---|---|
| 2004/0194329 A1* | 10/2004 | Drahos | G01C 9/12 |
| | | | 33/366.11 |
| 2011/0302796 A1* | 12/2011 | Schubert | G01C 9/06 |
| | | | 33/366.11 |
| 2012/0165165 A1* | 6/2012 | Iankov | A63B 21/0724 |
| | | | 482/106 |
| 2013/0288859 A1 | 10/2013 | Watterson | |
| 2015/0243185 A1* | 8/2015 | Purdy | A63B 71/0622 |
| | | | 434/247 |
| 2017/0128765 A1* | 5/2017 | Garretson | A63B 21/0724 |
| 2017/0216665 A1* | 8/2017 | Mahr | A61B 5/6895 |
| 2020/0009442 A1* | 1/2020 | Kasabdji Raffensperger | |
| | | | A63B 26/003 |
| 2020/0206568 A1* | 7/2020 | Hong | G09B 19/0038 |

* cited by examiner

EXERCISE APPARATUS CALIBRATION SYSTEM

TECHNICAL FIELD

The present disclosure relates generally to a device for measuring and improving exercise performance. More particularly, the present disclosure relates to an exercise calibration system for leveling an exercise apparatus during performance of a weightlifting exercise.

BACKGROUND

Weight training using barbells and similar exercise equipment is popular and effective at building strength and muscle. However, when performing weightlifting exercises using barbells, proper form is vital for preventing unbalanced muscle development. It is common for a person to have one side of the body which is stronger than the other side. For example, for a right-handed person, the dominant right arm is often stronger than the left arm. Consequently, when performing weightlifting exercises using a barbell, this imbalance in strength may result in the right end of the barbell being lifted slightly higher than the left end. Unless corrected, failure to maintain the barbell in a level position causes unbalanced muscle growth and may also result in serious injuries when one side of the body tries to overcompensate for the other side. While a trainer or exercise partner can assist a user by spotting the imbalanced barbell, imbalances may be difficult to discern visually. In many situations, the user does not have a partner or trainer available and must exercise alone.

Many devices for calibrating or balancing barbells can be found within the prior art. Certain devices incorporate integral or detachable leveling indicators which assist the user in maintaining the barbell in a level position. However, the user may not be able to see the leveling indicator, or worse, may become dangerously distracted while attempting to observe the leveling indicator during very strenuous weight training. Other devices are designed to be attached to barbells and project lines against a gridded wall using lasers, in order to give the user feedback regarding the quality of the user's technique. However, in many instances, the barbell may rotate in relation to its central axis, either inadvertently or by the nature of the particular exercise, thus ruining the consistency and value of the laser projection.

Therefore a need exists for an improved exercise device which can be attached to any barbell-like exercise apparatus and which is capable of accurately detecting an elevation discrepancy between the ends of the barbell indicating imbalance and conveying clear signals to the user, allowing the user to correct the imbalance with minimal distractions. Furthermore this improved device must be capable of compensating for the axial rotation of the barbell, either inadvertently or during exercises such as bicep curls, while continuing to deliver accurate measurements.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a device for levelling an exercise apparatus during performance of a weightlifting exercise to prevent unbalanced muscle development and injury to a user. Accordingly, the present disclosure provides a pair of exercise calibration devices comprising a right exercise calibration device and a left exercise calibration device. Each exercise calibration device has a distance sensor with a downward orientation, and is adapted to be attached to an exercise apparatus comprising a bar with a first end and a second end, allowing the exercise calibration devices to measure a right elevation and a left elevation between each of the first and second ends and a horizontal exercise surface upon which the exercise is performed, and detect an elevation discrepancy between the right and left elevations. The exercise calibration devices are adapted to wirelessly communicate with a user device, allowing an elevation discrepancy alert to be delivered to the user, informing the user to correct the elevation discrepancy by raising either the first end or the second end of the exercise apparatus until the right and left elevations are substantially equal.

It is another aspect of an example embodiment in the present disclosure to provide a device which accurately measures elevation even when the bar of the exercise apparatus is rotated axially. Accordingly, each exercise calibration device has a device housing with a rotation spindle passing therethrough, which allows the device housing to rotate about the rotation spindle. Furthermore, each rotation spindle has an attachment point which allows the exercise calibration device to be attached to the exercise apparatus. When each exercise calibration device is attached to the bar of the exercise apparatus, gravity acts upon a lower portion of device housing containing the distance sensor, allowing the device housing to rotate in a direction counter to the axial rotation of the bar and the rotation spindle, thus maintaining the downward orientation of the distance sensor.

It is a further aspect of an example embodiment in the present disclosure to provide a device which delivers clear instructions to the user for correcting the elevation discrepancy during the weightlifting exercise. Accordingly, the user device is adapted to deliver the elevation discrepancy alert through a pair of earphones, thus informing the user to raise the first or second end of the exercise apparatus by delivering an audible signal to the user's right ear or left ear respectively.

It is yet a further aspect of an example embodiment in the present disclosure to provide a device which allows the user to identify and correct patterns of imbalance which occur during the weightlifting exercise. Accordingly, the present disclosure provides an exercise application implemented upon the user device, which associates repetitions of the weightlifting exercise with the right and left elevation data, allowing the user to identify when the elevation discrepancies occur during the weightlifting exercise.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
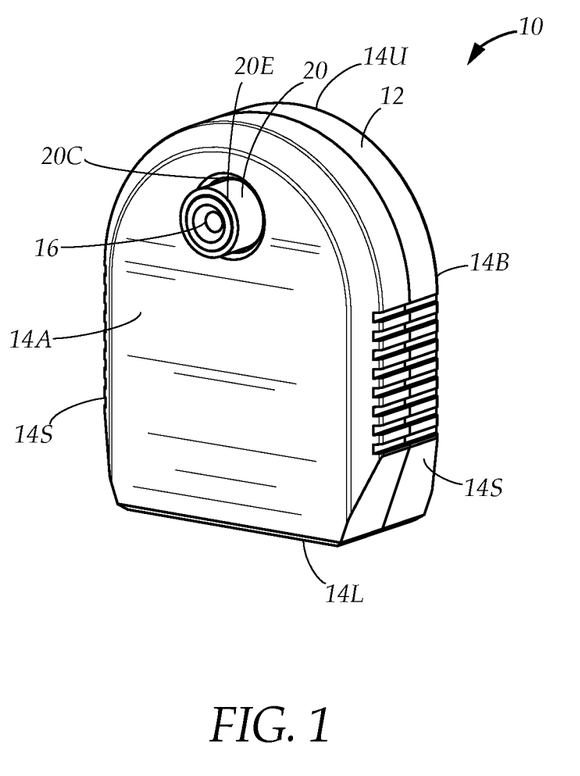
FIG. 1 is a diagrammatical perspective view of an exercise calibration device having a device housing, further showing a housing inner face with a rotation spindle and a magnetic attachment point projecting from the housing, in accordance with an embodiment in the present disclosure.
Figure 2:
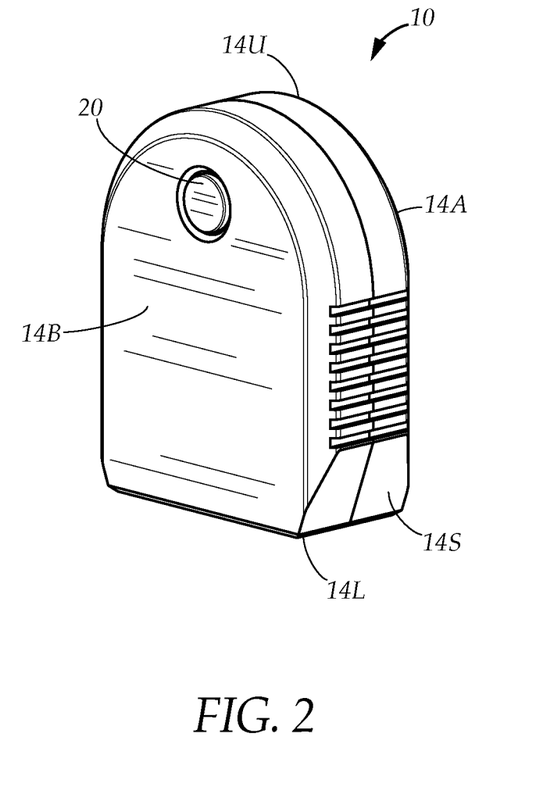
FIG. 2 is a diagrammatical perspective view of the exercise calibration device, showing a housing outer face, in accordance with an embodiment in the present disclosure.
Figure 3:
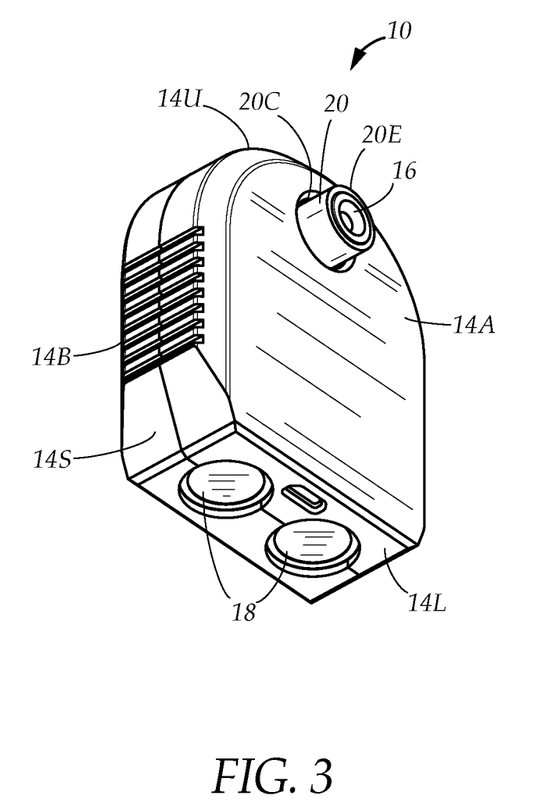
FIG. 3 is a diagrammatical perspective view of the exercise calibration device viewed from below, showing a housing lower portion with a downward facing distance sensor, in accordance with an embodiment in the present disclosure.
Figure 4:
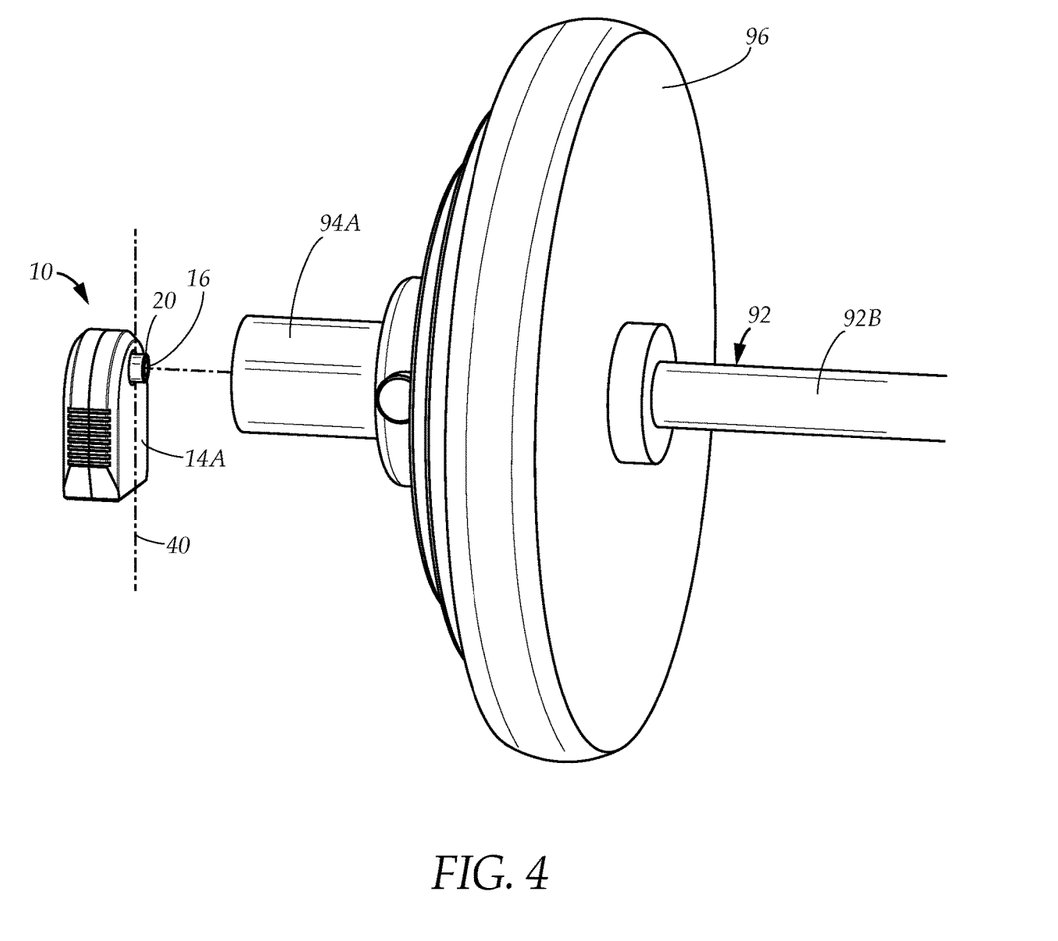
FIG. 4 is a diagrammatical perspective view of the exercise calibration device ready to be attached to an exercise apparatus via the magnetic attachment point, in accordance with an embodiment in the present disclosure.
Figure 6:
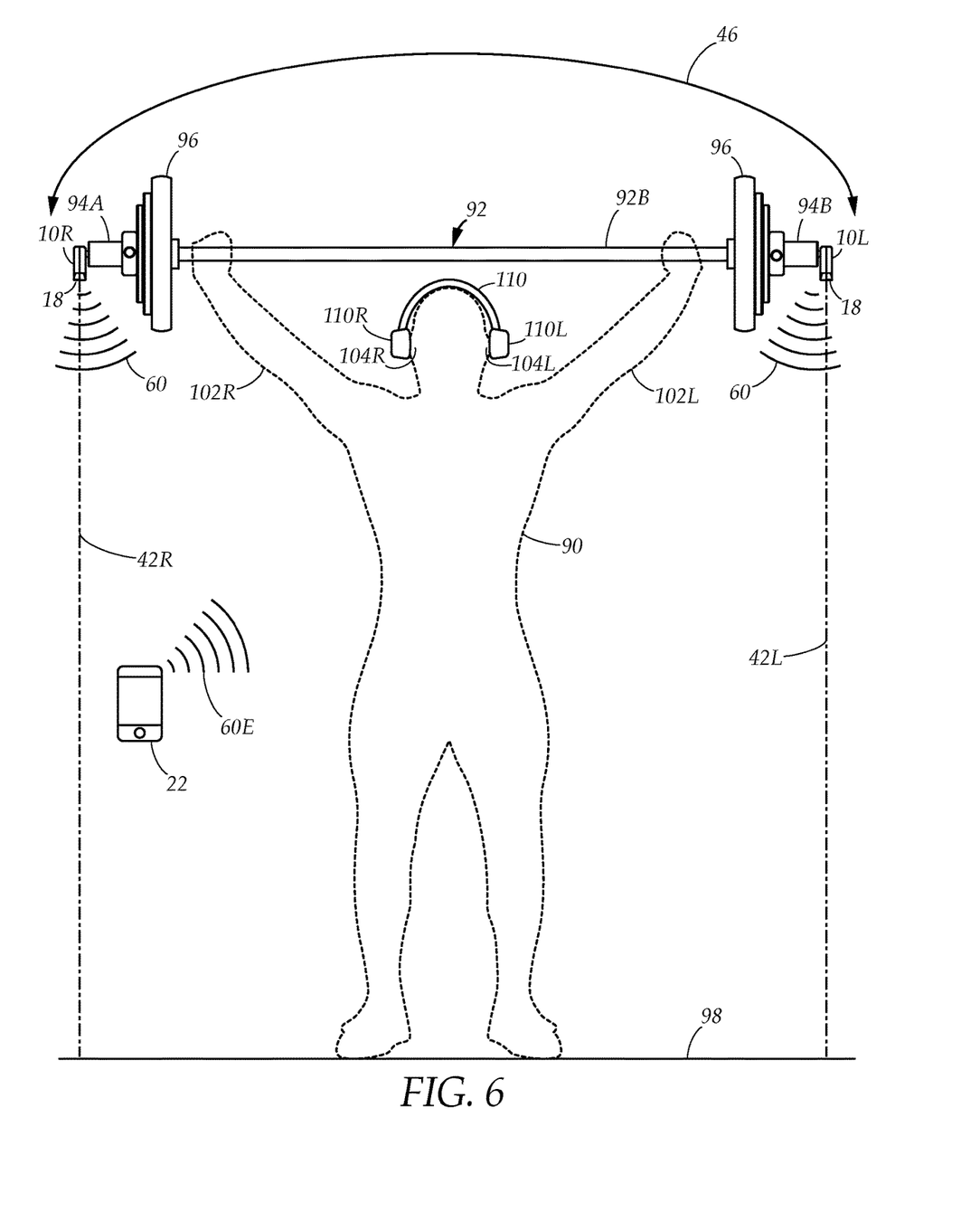
FIG. 6 is a diagrammatic front view depicting a user employing the exercise apparatus with a pair of exercise calibration devices comprising a right exercise calibration device and a left exercise calibration device, further showing the user wearing earphones to receive audible alerts, in accordance with an embodiment in the present disclosure.

FIGS. 1-3 illustrate an exercise calibration device 10 comprising a device housing 12, a rotation spindle 20 which passes laterally through the device housing 12, and a downward facing distance sensor 18. Turning briefly to FIGS. 4 and 6, the exercise calibration device 10 is adapted to be attached to an exercise apparatus 92 adapted to be employed by a user 90 for performing a weightlifting exercise. The distance sensor 18 is adapted to detect elevation by measuring the vertical distance between the exercise calibration device 10 and a horizontal exercise surface 98 upon which the weightlifting exercise is performed. The exercise apparatus 92 may be a barbell with a bar 92B having a first end 94A and a second end 94B, with weights 96 positioned thereon proximate to the first and second ends 94A, 94B. To perform the weightlifting exercise, the user 90 grasps the bar 92B using the right arm 102R and left arm 102L, and repeatedly raises and lowers the exercise apparatus 92. Note that the exercise calibration device 10 may be employed with a variety of weightlifting exercises, as will be apparent to a person of ordinary skill in the art in the field of the invention. For example, the weightlifting exercise may correspond to barbell curls, bench press, shoulder press, squats, or any similar exercise.

The exercise calibration device 10 is used in functionally identical pairs, comprising a right exercise calibration device 10R and a left exercise calibration device 10L which are attached to the first and second ends 94A, 94B of the exercise apparatus 92 respectively. The right and left calibration devices 10R, 10L are adapted to be operably connected to a user device 22 to form an exercise calibration system. The right and left exercise calibration devices 10R, 10L are adapted to measure a right and left elevation 42R, 42L, and transmit elevation data 60 to the user device. The user device 22 is adapted to detect an elevation discrepancy 46 between the left and right elevation 42L, 42R, and alert the user 90 via an elevation discrepancy alert 60E, to aid the user 90 in maintaining a consistent elevation between the first and second ends 94A, 94B of the exercise apparatus 92 while performing the weightlifting exercise. This prevents unbalanced muscle development and the serious injuries which may occur if the elevation discrepancy 46 goes uncorrected.

Returning to FIGS. 1-4, in a preferred embodiment, the device housing 12 has an inner face 14A and an outer face 14B disposed opposite the inner face. The device housing 12 also has a housing lower portion 14L, and a housing upper portion 14U. The distance sensor 18 is positioned at the housing lower portion 14L. The device housing 12 may also have a pair of housing sides 14S which extend between the inner and outer faces 14A, 14B. The rotation spindle 20 passes through the device housing 12 through a rotation spindle channel 20C that runs laterally from the housing inner face 14A towards the housing outer face 14B. The rotation spindle channel 20C is positioned proximate to the housing upper portion 14U, and is located equidistant between the housing sides 14S. The rotation spindle 20 has an inner end 20E which projects from the housing inner face 14A, and a magnetic attachment point 16 positioned at the inner end 20E.

Referring to FIG. 4, and FIGS. 5A and 5B, and FIG. 6, the exercise calibration device 10 is adapted to be removably attached to the first or second ends 94A, 94B of the exercise apparatus 92 via the magnetic attachment point 16. During the performance of the weightlifting exercise, the user 90 repeatedly raises and lowers the exercise apparatus 92, which may result in the bar 92B being rotated axially. Once the exercise calibration device 10 is attached to either the first or second end 94A, 94B of the bar 92B, the movement of the bar 92B may cause the exercise calibration device 10 to experience axial rotation 44. By allowing the device housing 12 to rotate about the rotation spindle 20, the exercise calibration device 10 is adapted to consistently orient the distance sensor 18 in a downward direction towards the horizontal exercise surface 98 to counter the axial rotation 44 of the exercise calibration device 10.

In a preferred embodiment, a bearing assembly 29B located within the rotation spindle channel 20C allows the rotation spindle 20 to freely rotate therein. The rotation spindle 20 is positioned proximate to the housing upper portion 14U, thereby allowing gravity to act upon the housing lower portion 14L. This causes the device housing 12 to rotate about the rotation spindle 20 in a direction counter to the axial rotation 44, thus ensuring that the exercise calibration device remains aligned with a vertical axis 40 which is perpendicular to the bar 92B and which runs laterally through the center of the rotation spindle 20. In certain embodiments, weights may be placed within the housing lower portion 14L to ensure that the distance sensor 18 remains oriented downwardly.

Note that the device housing 12 may be formed using a variety of shapes while adhering to the principles of the present disclosure. For example, in an embodiment where the device housing 12 has a curved or rounded shape, the inner face 14A, outer face 14B, upper and lower portions 14U, 14L may designate facings which orient the exercise calibration device in relation to the exercise apparatus 92 and the horizontal exercise surface.

Figure 5A:
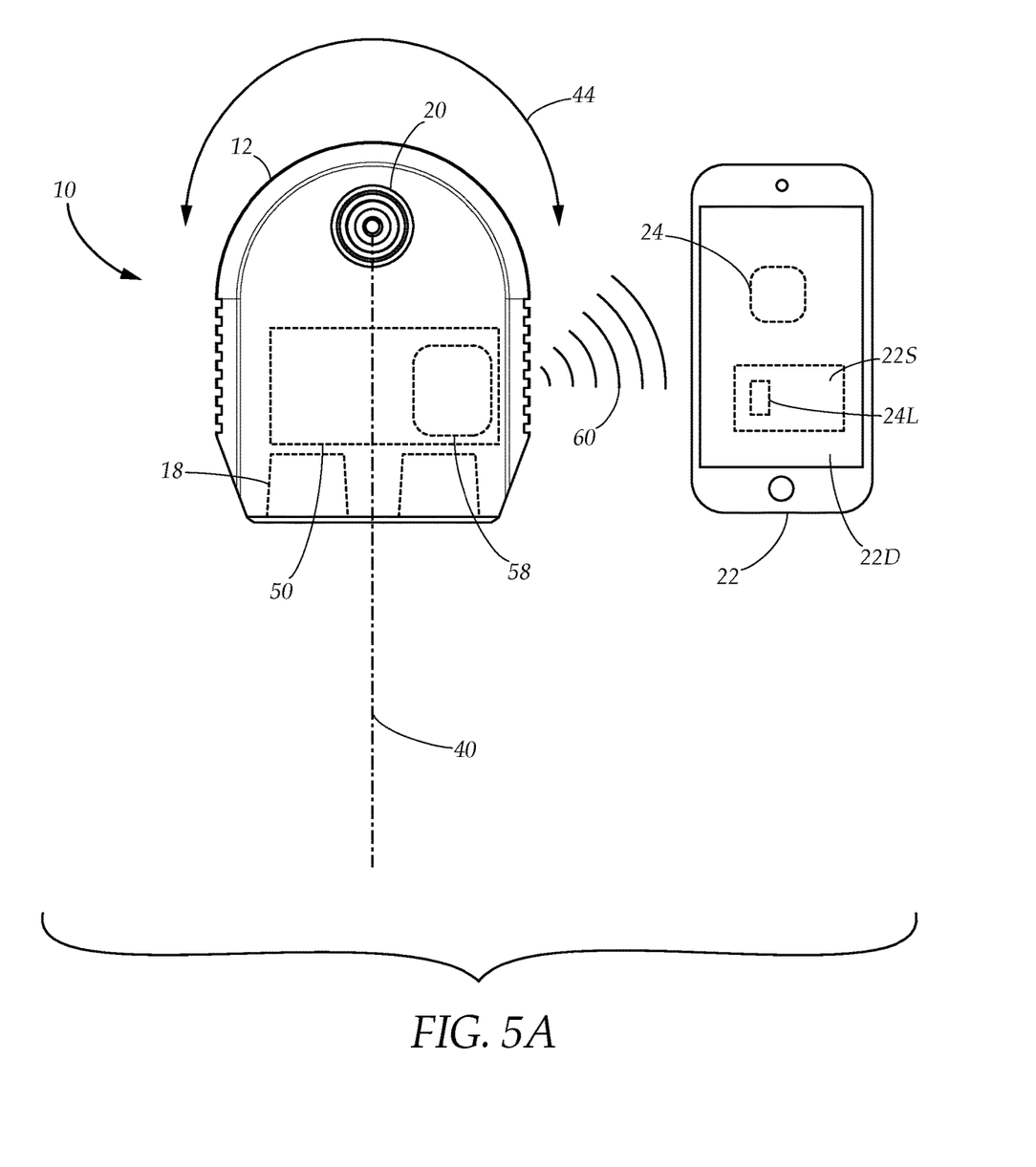
FIG. 5A is a diagrammatical front view of the exercise device with a vertical axis passing through the rotation spindle, whereby the housing rotates about the spindle to maintain alignment with the vertical axis to maintain the downward orientation of the distance sensor, further showing an exemplary user device which communicates with the calibration device, in accordance with an embodiment in the present disclosure.
Figure 5B:
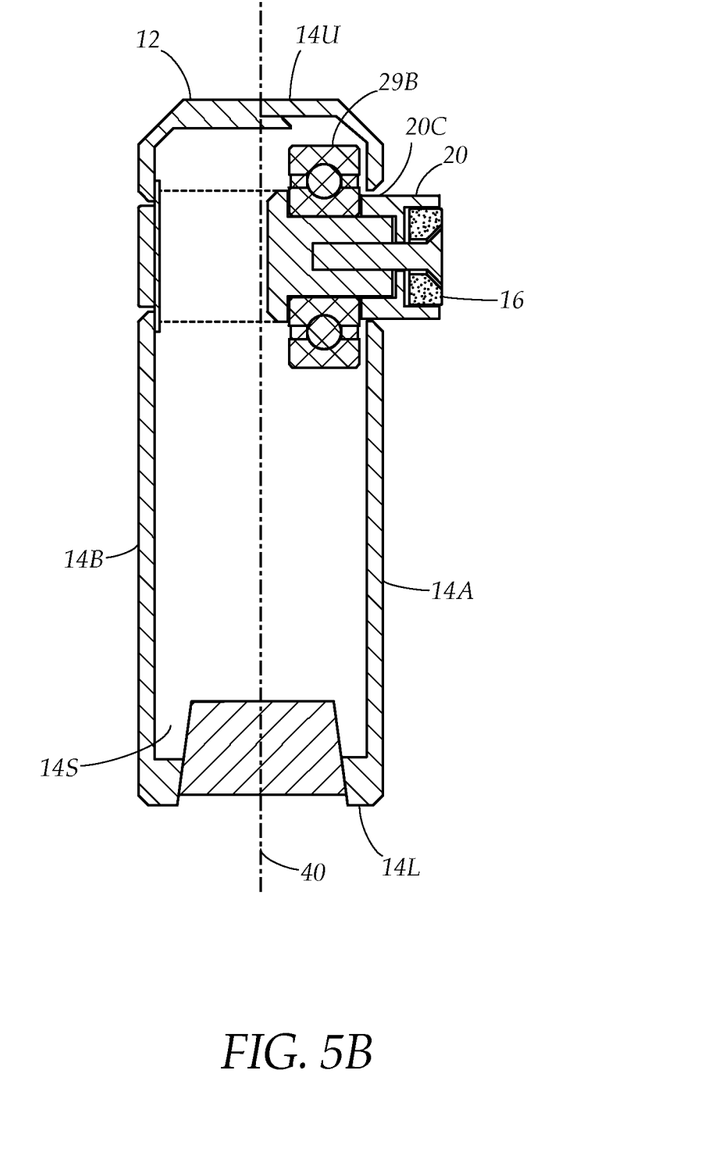
FIG. 5B is a diagrammatic side cross section view of the exercise calibration device, showing a bearing assembly which facilitates rotation of the device housing about the rotation spindle, in accordance with an embodiment in the present disclosure.

Referring to FIG. 3, FIG. 5A, and FIG. 6, the distance sensor 18 may be implemented using an ultrasonic range finder which is adapted to measure the distance between the lower portion 14L of the exercise calibration device 10 and the horizontal exercise surface 98. Note that any suitable range-finding sensing technology may be employed in adherence with the principles of the present disclosure, as can be appreciated by a person of ordinary skill in the art in the field of the invention. For example, the distance sensor 18 may utilize LIDAR technology (light detection and ranging) employing an infra-red or a laser based sensor.

Figure 5C:
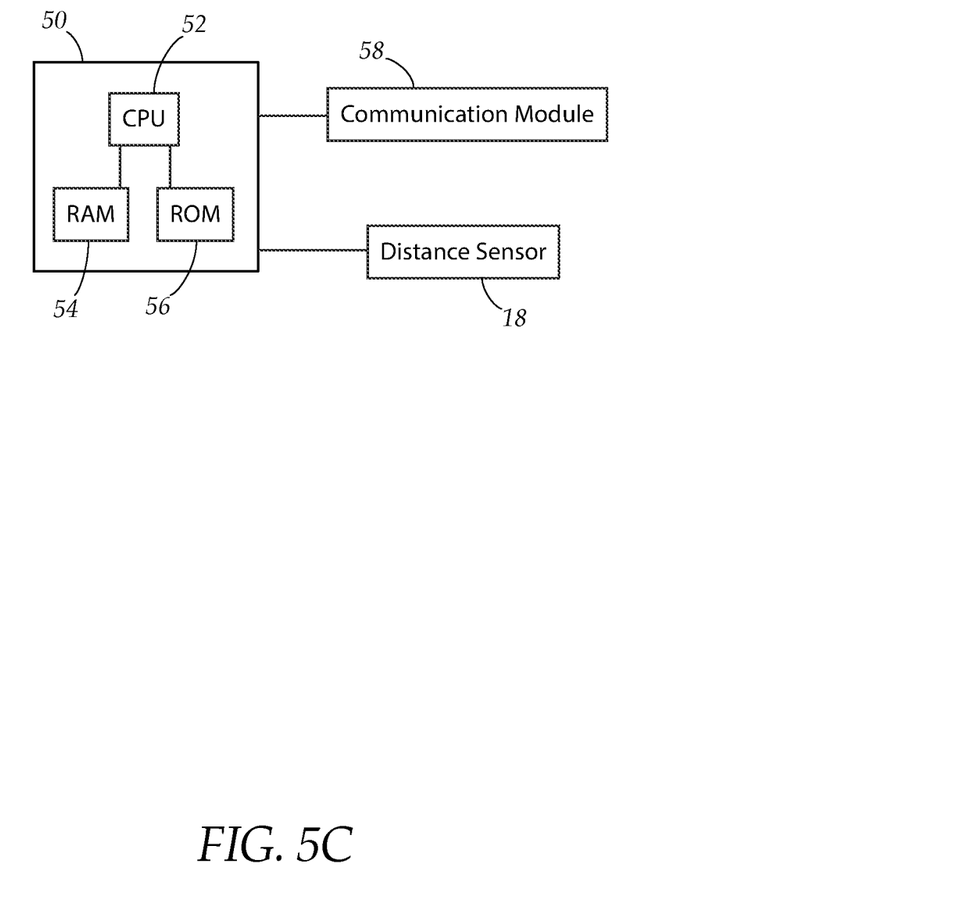
FIG. 5C is a block diagram depicting a control module which is operably linked to a communication module and the distance sensor, in accordance with an embodiment in the present disclosure.

Referring to FIGS. 5A, 5C, and FIG. 6, the exercise calibration device 10 further has a control module 50 positioned within the device housing 12. The control module 50 controls the operation of the distance sensor 18, and comprises a CPU 52, a RAM 54, and a ROM 56. The control module 50 may be implemented using an integrated circuit, microcontroller, or any similar implementation, as will be apparent to a person of ordinary skill in the art in the field of the invention. The exercise calibration device 10 further has a communication module 58 adapted to wirelessly communicate with another exercise calibration device 10 and the user device 22. The communication module 58 may employ any RF communication protocol utilized to facilitate data communication between computing devices, such as Bluetooth, or any other protocol which will be apparent to a person of ordinary skill in the art. The exercise calibration device 10 may be powered using a rechargeable battery positioned anywhere within the device housing 12.

The user device 22 may be a smartphone, tablet, or any other portable computing device capable of wirelessly communicating with the exercise calibration device 10. The user device 22 may further have a digital screen 22D capable of displaying a graphical user interface, and a user device storage 22S capable of storing persistent data. The user device 22 may also be used to execute an exercise application 24. In a preferred embodiment, the right and left exercise calibration devices 10R, 10L measure and transmit the right and left elevation 42R, 42L to the user device 22 via the elevation data 60. The user device 22, via the exercise application 24, compares the right and left elevation 42R, 42L and determines the presence of an elevation discrepancy 46 between the right and left elevation 42R, 42L. The elevation data 60 may be timestamped, thus allowing the right and left elevation 42R, 42L to be recorded and compared at specific times during the weightlifting exercise. In one embodiment, the right and left elevation 42R, 42L may be detected and recorded 100 times per second. Note that this example is non-limiting, and the elevation data 60 may be recorded any number of times across a given time interval.

In one example where an elevation discrepancy 46 is detected, the left elevation 42L may be lower than the right elevation 42R, indicating that the user 90 must raise the second end 94B of the bar 92B to correct the elevation discrepancy 46. The exercise application 24 may notify the user 90 of the elevation discrepancy 46 via an elevation discrepancy alert 60E. The elevation discrepancy alert 60E indicates to the user 90 whether the right or left elevation 42R, 42L is lower, allowing the user 90 to make the necessary adjustments to raise either the first or second ends 94A, 94B of the bar 92B to ensure that the exercise apparatus 92 is level.

The elevation discrepancy alert 60E may be displayed on the screen 22D of the user device 22, or emitted as an audible tone or message. In a preferred embodiment, the exercise calibration system further comprises a pair of earphones 110 having a right earphone 110R and a left earphone 110L adapted to deliver audible signals to a right ear 104R and a left ear 104L of the user 90 respectively. The earphones 110 may be connected to the user device 22 either wirelessly or via a wired connection. The elevation discrepancy alert 60E may be emitted through either the right earphone 110R or the left earphone 110L. For example, if the left elevation 42L is lower than the right elevation 42R, the elevation discrepancy alert 60E may be emitted through the left earphone 110L.

Furthermore, the exercise application 24 may utilize changes in the right and left elevation 42R, 42L to determine when a repetition starts and ends. In a preferred embodiment, the start of the repetition is registered when the left and right elevation 42L, 42R increases until reaching a peak elevation value. Once the right and left elevation 42R, 42L decrease and reach a minimum elevation value, the end of the repetition is registered. The timestamp of the start and end of each repetition may be recorded by the exercise application 24 using the user device storage 22S, along with the associated elevation data 60, to form an exercise log 24L. The user 90 may review the stored exercise log 24L to determine at which point the elevation discrepancy 46 occurs during each repetition.

Figure 7:
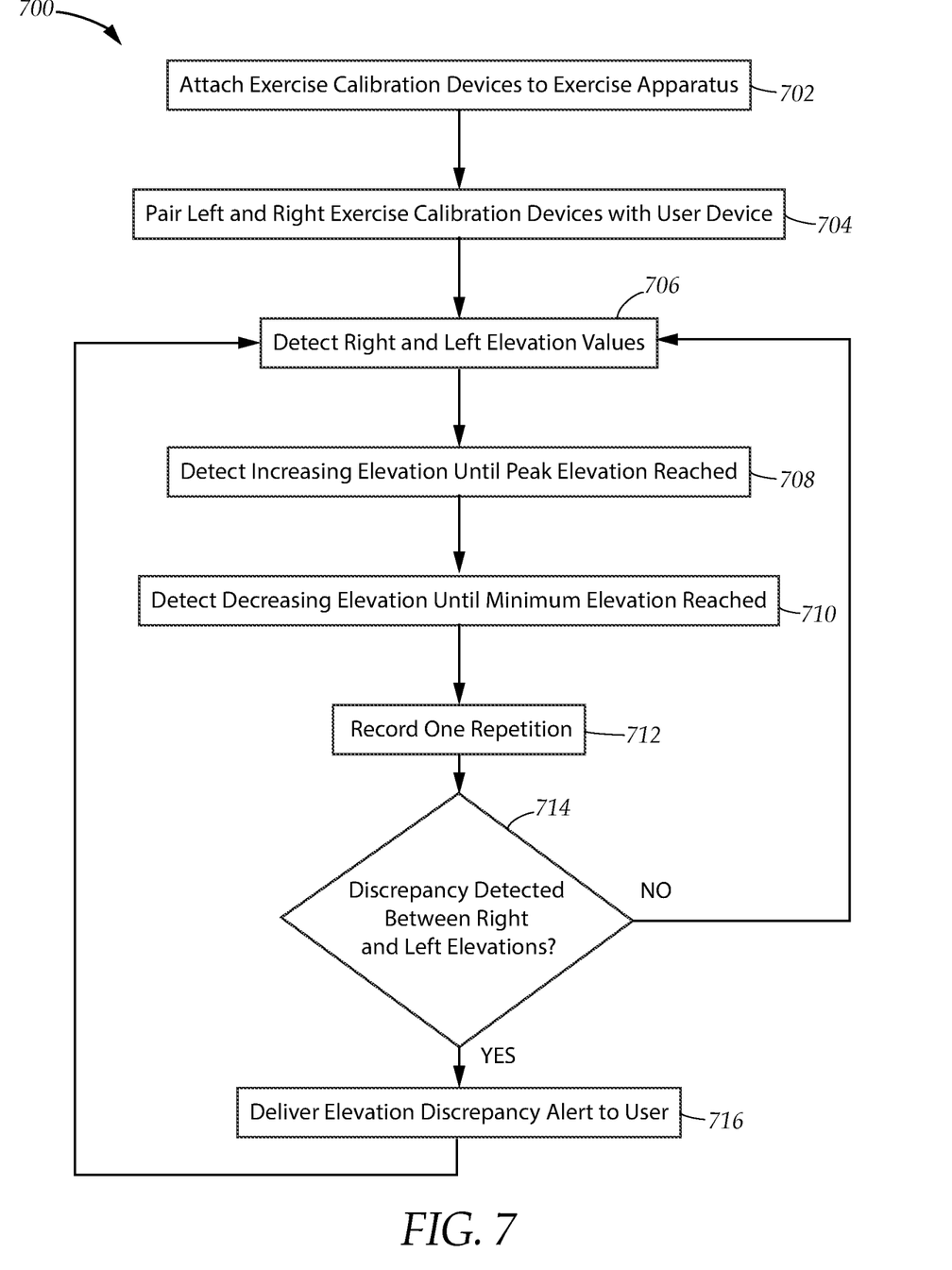
FIG. 7 is a flowchart depicting an exemplary calibrated exercise process, in accordance with an embodiment in the present disclosure.

Turning to FIG. 7 while continuing to refer to FIG. 5A and FIG. 6, an exemplary calibrated exercise process 700 is shown. At step 702, the right and left exercise calibration devices 10R, 10L are attached to the first and second ends 94A, 94B of the exercise apparatus 92 respectively. At step 704, the right and left exercise apparatus 94A, 94B each wirelessly "pair" with, and become operably connected to, the user device 22. Next, the right and left exercise calibration devices 10R, 10L begin detecting the right and left elevation 42R, 42L at step 706, and the user 90 may begin the weightlifting exercise. The user 90 grips the bar 92B with the user's right and left arms 102R, 102L such that the first end 94A and second end 94B are oriented towards the right and left of the user 90, and raises the exercise apparatus 92 to begin a repetition. At step 708, the right and left exercise calibration devices 10R, 10L detect an increase in the right and left elevation 42R, 42L until a peak elevation is reached. At step 710, the right and left exercise calibration devices 10R, 10L detect a decrease in the right and left elevation 42R, 42L until a minimum elevation is reached. The exercise application 24 then records the completion of the repetition at step 712. At step 714, the user application 24 compares the elevation data 60 recorded during the repetition, and determines if an elevation discrepancy 46 occurred. If an elevation discrepancy 46 is detected, the user application 24 delivers an elevation discrepancy alert 60E to the user 90 at step 716, indicating whether the first or second end 94A, 94B must be raised to correct the elevation discrepancy 46. Once the elevation discrepancy alert 60E is delivered, or if no elevation discrepancy 46 occurred at step 714, the process returns to step 706, and the right and left exercise calibration devices 10R, 10L continue to detect the right and left elevation 42R, 42L, allowing the user 90 to begin the next repetition.

Note that the steps of the exemplary process 700 may be varied and/or rearranged in adherence with the principles of the present disclosure. For example, the elevation discrepancy 46 may be detected, and the elevation discrepancy alert 60E may be delivered, in real time at any point in the process. In one embodiment, the elevation discrepancy alert 60E may be delivered immediately to the user 90 once the exercise application 24 determines that an elevation discrepancy 46 has occurred. In one embodiment, the audible signal corresponding to the elevation discrepancy alert 60E may continue to be delivered until the elevation discrepancy 46 is corrected. Alternatively, the elevation discrepancy alert 60E may be delivered at the conclusion of each repetition.

Referring to FIG. 6, in an alternate embodiment, the right and left exercise calibration devices 10R, 10L may operate without a user device 22. For example, right and left exercise device 10R, 10L may be configured to wirelessly exchange and compare the elevation data 60 detected by each device, and deliver the elevation discrepancy alert 60E to the user 90 through the earphones 110.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented an exercise apparatus calibration system. The disclosure is illustrated by example in the drawing figures, and throughout the written description. It should be understood that numerous variations are possible, while adhering to the inventive concept. Such variations are contemplated as being a part of the present disclosure.

What is claimed is:

1. An exercise calibration system adapted for use with an exercise apparatus having a bar with a first end and a second end, the exercise apparatus is adapted to be held by a user while performing a weightlifting exercise, the weightlifting exercise is performed upon a horizontal exercise surface, and the user performs the weightlifting exercise by raising and lowering the exercise apparatus while keeping the bar substantially level with the horizontal exercise surface, whereby the bar of the exercise apparatus is rotated axially during the performance of the weightlifting exercise, and each raising and lowering of the exercise apparatus corresponds to one repetition, the system comprising:

a pair of exercise calibration devices comprising a right exercise calibration device and a left calibration device, the right exercise calibration device is adapted to be attached to the first end of the bar of the exercise apparatus, the left exercise calibration device is adapted to be attached to the second end of the bar of the exercise apparatus, each exercise calibration device has a device housing, the device housing having an upper portion and a lower portion, the device housing further has an inner face, an outer face, a rotation spindle, and a rotation spindle channel which is positioned proximate to the upper portion of the device housing and passes from the inner face towards the outer face, the device housing further has a bearing assembly within the rotation spindle channel, the rotation spindle passes through the rotation spindle channel and the bearing assembly allowing the device housing to rotate about the rotation spindle, the rotating spindle has an attachment point which projects away from the inner face of the device housing and is adapted to attach to either the first end or the second end of the bar of the exercise apparatus, the inner face is oriented towards the exercise apparatus when the exercise calibration device is attached thereto while the outer face is oriented opposite thereof, each exercise calibration device further has a distance sensor positioned at the lower portion of the device housing, each distance sensor has a downward orientation facing the horizontal exercise surface, and is adapted to detect an elevation corresponding to a distance between the distance sensor and the horizontal exercise surface during the weightlifting exercise, whereby the right exercise calibration device is adapted to detect and transmit a right elevation, and the left exercise calibration device is adapted to transmit a left elevation, the device housing is adapted to rotate about the rotation spindle in a direction counter to the axial rotation of the bar of the exercise apparatus, maintaining the downward orientation of the distance sensor; and a user device adapted to wirelessly communicate with the pair of exercise calibration devices, the user device is adapted to receive the right and left elevation transmitted by the right and left exercise calibration devices, and detect an elevation discrepancy whereby either the right elevation or the left elevation is higher than the other, the user device is further adapted to deliver an elevation discrepancy alert to the user, informing the user to increase either the right elevation or the left elevation to correct the elevation discrepancy until the right and left elevations are substantially equal.

2. The exercise calibration system as described in claim 1 wherein:

the exercise calibration system further comprises a pair of earphones having a right earphone and a left earphone, the pair of earphones are adapted to receive the elevation discrepancy alert from the user device, the elevation discrepancy alert corresponds to an audible signal, the audible signal is delivered to the right earphone when the left elevation exceeds the right elevation, and to the left earphone when the right elevation exceeds the left elevation.

3. The exercise calibration system as described in claim 2, wherein:

the user device is adapted to execute a user application, the user application is adapted to detect an increase in the right and left elevation until a peak elevation is reached, followed by a decrease in the right and left elevation until a minimum elevation is reached, whereupon the exercise application is adapted to record a completion of the repetition.

4. The exercise calibration system as described in claim 3, wherein the exercise application is adapted to record and store an exercise log associating each completed repetition with each elevation discrepancy which is detected during the repetition.

5. The exercise calibration system as described in claim 4, wherein the attachment point of each exercise calibration device has a magnet which allows each exercise calibration device to be removably attached to the exercise apparatus.

6. A method for calibrating a weightlifting exercise, the weightlifting exercise is performed by a user upon a horizontal exercise surface, and employs an exercise apparatus, the exercise apparatus having a bar with a first end and a second end, the method comprising the steps of:

providing a pair of exercise calibration devices comprising a right exercise calibration device and a left exercise calibration device, each exercise calibration device is adapted to be attached to the exercise apparatus and has a distance sensor with a downward orientation facing the horizontal exercise surface, the distance sensor is adapted to detect an elevation corresponding to a distance between the distance sensor and the horizontal exercise surface during the weightlifting exercise, each exercise calibration device has a device housing, and a rotation spindle passing laterally therethrough, the device housing is adapted to rotate about the rotation spindle, the device housing having an upper portion and a lower portion, the distance sensor is positioned at the lower portion, the rotation spindle has an attachment point which is adapted to attach to either the first or second end of the bar of the exercise apparatus;

providing a user device adapted to communicate wirelessly with the pair of exercise calibration devices;

attaching the attachment point of the right exercise calibration device to the first end of the bar of the exercise apparatus, and attaching the attachment point of the left exercise calibration device to the second end of the bar of the exercise apparatus;

performing the weightlifting exercise by the user raising the exercise apparatus away from the horizontal exercise surface, lowering the exercise apparatus towards the horizontal exercise surface, and axially rotating the bar of the exercise device during the weightlifting exercise;

rotating, via gravity, the device housing of each exercise calibration device about the rotation spindle of said exercise calibration device in a direction counter to the axial rotation of the bar of the exercise apparatus, and maintaining the downward orientation of the distance sensors of each exercise calibration device;

detecting a right elevation by the right exercise calibration device, and a left elevation by the left exercise calibration device;

transmitting the right and left elevation to the user device;

recording a repetition of the weightlifting exercise by detecting an increase in the right and left elevation until a peak elevation is reached, followed by a decrease in the right and left elevation until a minimum elevation is reached;

detecting an elevation discrepancy whereby either the right elevation exceeds the left elevation or the left elevation exceeds the right elevation; and delivering an elevation discrepancy alert to the user, informing the user to increase either the right elevation or the left elevation until the right and left elevations are substantially equal.

7. The method as described in claim 6, wherein:

the step of providing a user device is followed by the step of: providing a pair of earphones having a right earphone and a left earphone which are adapted to deliver an audible signal; and the step of delivering an elevation discrepancy alert to the user further comprises informing the user to increase the right elevation or the left elevation by delivering the elevation discrepancy alert to the right earphone or the left earphone respectively.

8. The method as described in claim 7, wherein:

the step of delivering an elevation discrepancy alert to the user is followed by the step of: recording an exercise log using the user device, and associating each completed repetition with each elevation discrepancy which is detected during the repetition.

\* \* \* \* \*